United States Patent
Lyle et al.

(10) Patent No.: US 7,512,662 B2
(45) Date of Patent: Mar. 31, 2009

(54) SYSTEM AND METHOD FOR USER REGISTRY MANAGEMENT OF MESSAGES

(75) Inventors: Ruthie D. Lyle, Durham, NC (US); Candice Leontine Coletrane, Morrisviille, NC (US); Jamel Pleasant Lynch, Jr., Carrboro, NC (US); McGill Quinn, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/741,229

(22) Filed: Dec. 19, 2003

(65) Prior Publication Data

US 2005/0149606 A1   Jul. 7, 2005

(51) Int. Cl.
*G06F 15/16* (2006.01)
(52) U.S. Cl. ..................................... 709/207
(58) Field of Classification Search ................. 709/200, 709/205, 207, 206
See application file for complete search history.

(56) References Cited

U.S. PATENT DOCUMENTS

| | | | |
|---|---|---|---|
| 6,750,881 B1 * | 6/2004 | Appelman | 715/733 |
| 7,065,187 B2 * | 6/2006 | Myers et al. | 379/88.22 |
| 2002/0083136 A1 | 6/2002 | Whitten, II | |
| 2002/0107950 A1 * | 8/2002 | Lu | 709/223 |
| 2004/0158610 A1 * | 8/2004 | Davis et al. | 709/206 |
| 2004/0236839 A1 * | 11/2004 | Wilson | 709/207 |
| 2005/0044160 A1 * | 2/2005 | McElligott | 709/207 |
| 2005/0055416 A1 * | 3/2005 | Heikes et al. | 709/207 |
| 2005/0076084 A1 * | 4/2005 | Loughmiller et al. | 709/206 |
| 2005/0080864 A1 * | 4/2005 | Daniell | 709/206 |
| 2005/0080868 A1 * | 4/2005 | Malik | 709/207 |

OTHER PUBLICATIONS

Miladinovic et al., "Instant messaging traffic reduction in the session initiation protocol"; Conference-paper;2003.*
Okuyama-S et al. "New mobile service based on instant message technology"; Journal-paper; 2001.*

* cited by examiner

*Primary Examiner*—Jason D Cardone
*Assistant Examiner*—Lin Liu
(74) *Attorney, Agent, or Firm*—Seth H. Ostrow; Dreier LLP (57) ABSTRACT

A system and method for providing user registry management of instant messages is disclosed. The system allows recipients to set filter criteria for filtering instant messages, the filter criteria being selected from a database of characteristics, or registry, for senders of the instant messages. When an instant message is received, the system determines the characteristics of the sender. The system blocks display of the received instant message if the filter criteria are met by the characteristics of the sender.

8 Claims, 6 Drawing Sheets

| Filter Criteria: | Include Only: | Exclude All: |
|---|---|---|
| Employee Position | Clerk | Clerks |
| Employee Position | Lawyer | Lawyers |
| Employee Position | Manger | Mangers |
| Area Code | | 949 |
| Domain Extension | | .uk |
| * * * | * * * | * * * |
| * * * | * * * | * * * |
| * * * | | |

SYSTEM AND METHOD FOR USER REGISTRY MANAGEMENT OF MESSAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods for user management of electronic messages. More particularly, the present invention provides a filter method and system for selective delivery and/or display of messages, such as instant messages, based on a sender's characteristics.

Instant messaging (IM) is a communication technology used by internet enabled computing devices, such as personal computers, personal digital assistants, and cell phones. Unsolicited/unannounced instant messages impede workplace efficiency, which is inimical to the original intent behind IM technology. As a result, the inventors have recognized a need for a robust, dynamic method for differentiating between desirable and undesirable messages to determine which instant messages should be delivered.

U.S. Patent Application No. 2002/0083136 A1 discusses a method of authorizing receipt of an instant message by a recipient user, which is a limited, insufficient, solution to the problem described above. This approach requires each IM recipient to manually maintain a static listing of authorized senders, which are categorized to denote delivery priority. A user may categorize their IM status as available, unavailable or busy-but-on-line or emergency so that potential senders may know whether they are able to send instant messages to the user. However, maintenance of the static listing requires constant updating, deleting and adding of authorized senders.

BRIEF SUMMARY OF THE INVENTION

The present invention addresses, among other things, the problems discussed above with using current user messaging systems.

In some embodiments, the present invention is a method and system for allowing an instant message recipient to manage instant messages to be received by logically imposing criteria on a user registry. The recipient sets message delivery permission to a selected subset of the total user registry. The advantage of logically imposing criteria on a user registry to manage messages is that it allows for dynamic management of instant messages, such that a static listing of permissible senders is not required. Criteria can be selected to allow different types of users to send messages to the recipient.

More specifically, the method and system allows recipients to set filter criteria for filtering messages, the filter criteria being selected from a database of characteristics, or registry, for senders of the messages. When a message is received, the system determines the characteristics of the sender. The system blocks display of the received message if the filter criteria are not met by the characteristics of the sender.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Preferred embodiments of the invention are now described with reference to the drawings. In accordance with the invention, and with reference to FIG. 1, a block diagram illustrates a networked system for providing management of instant messages. In this embodiment, a recipient's computer or electronic device 50 is connected to a network 10, which is an intranet 10. The intranet 10 may be a company intranet, which includes several user computers or electronic devices 48 from which the recipient's computer 50 may receive instant messages. A router 14 provides access to a wide area or public network, such as the internet 20, for computers or electronic devices 48 and 50 connected to the intranet 10. The router 14 allows computers or electronic devices 22 connected to the internet 20 to communicate with the computers or electronic devices 48 and 50 connected to the intranet 10.

Figure 1:
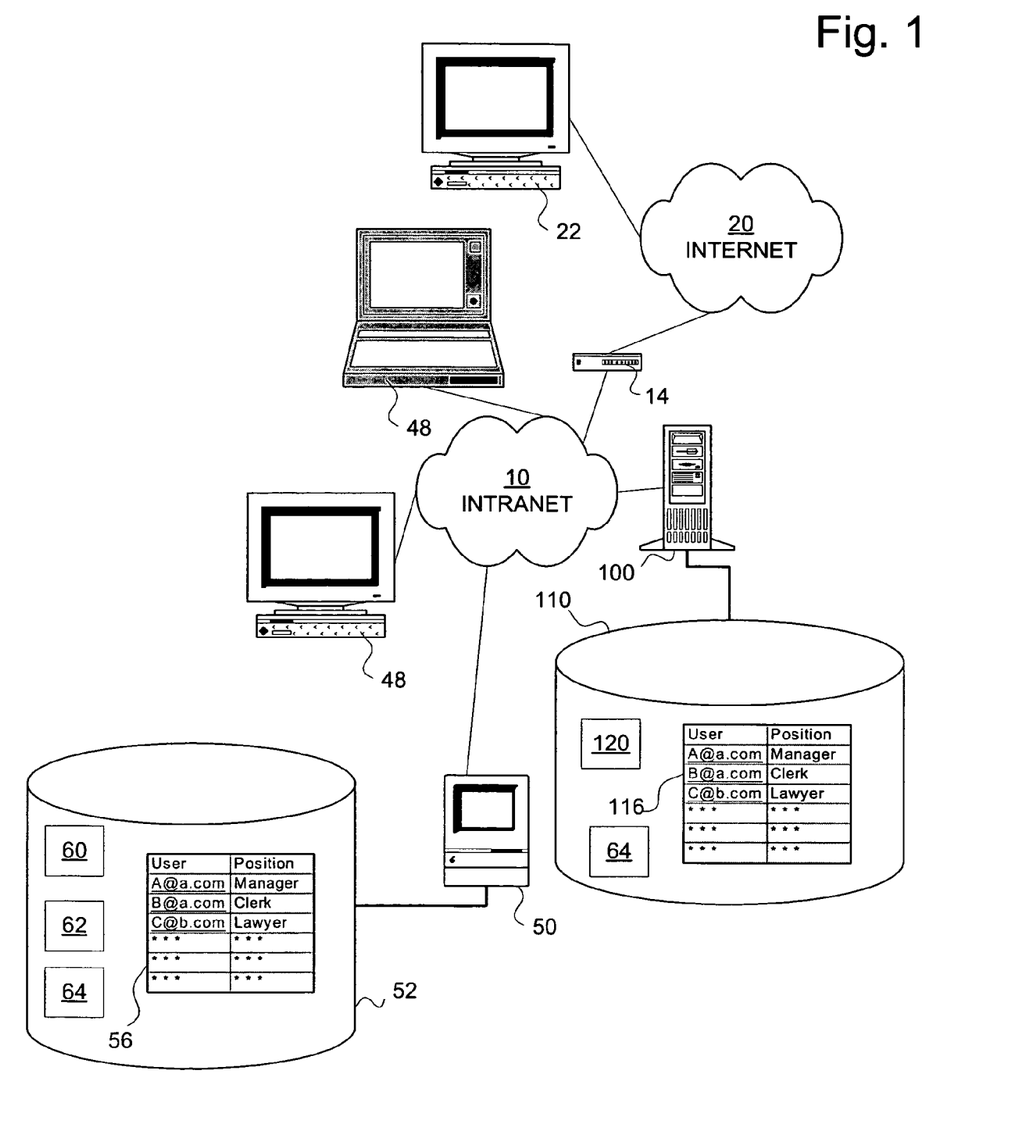
FIG. 1 is a block diagram illustrating a networked system for providing management of instant messages according to an embodiment of the present invention.
Figure 2:
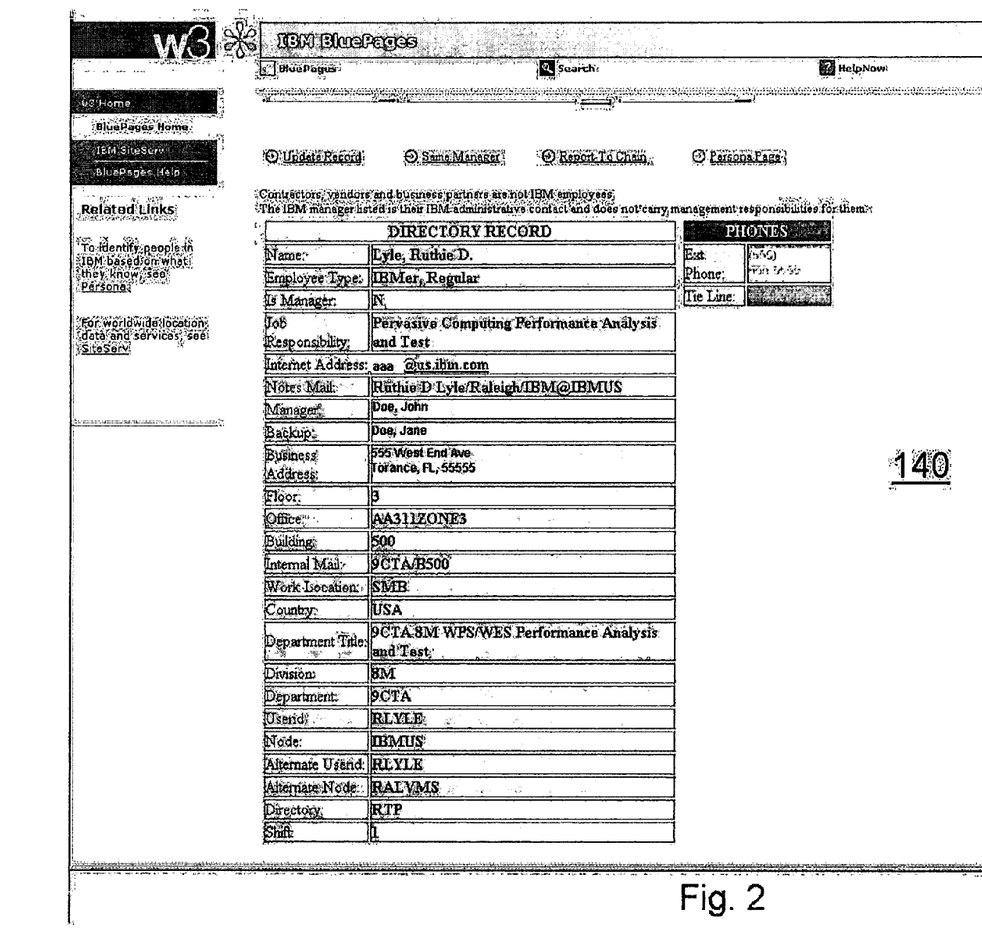
FIG. 2 is a block diagram illustrating an example of an entry page for the registry of FIG. 1.

A server 10 is electronically connected to an intranet 10. A centralized user registry 116 resides on the server 100 in a storage device 110 which may comprise a non-volatile memory device, such as a hard disk or a non-volatile random access memory device. The user of the recipient's computer 50 and user computers 48 can receive instant messages, and they may be members of the centralized user registry 116. Further, the user of computer 22 may be a member of the central user registry 116. Using the registry 116, criteria can be imposed to selectively assign permissibility for delivery of instant messages. For example, the IBM Corp. and other large corporations typically store employee information in a user registry. In the case of IBM, the registry is called BLUEPAGES. Using the recipient computer 50 as an example, each user who is working on a computer 48 or 50 which can receive instant messages uses message filter software 60 which can be used to set registry criteria for receiving instant messages. The registry software 60 can be used to access the centralized registry 116 to update a personal user's registry 56 maintained on the recipient's computer 50. With reference to FIG. 2, an example of a BLUEPAGE entry page 140 for registry 116 is shown. There are several fields in the registry, for example Name, Position, Department, Is Manager, Building, etc. Imposing criteria based on one or several of these fields allows the recipient to determine which instant messages should be delivered.

Using the IBM user registry BLUEPAGES as an example, the following examples illustrate a few of an almost infinite set of possible rules or business logic which is determined by the criteria set by a user for filtering instant messages:

1. Deliver messages from only those persons who are managers;
2. Deliver message from only those persons who are managers and who are in the recipient's division; or
3. Deliver message only from those persons who are managers, in the recipient's division, and those with U.S. internet addresses.

Using the recipient's computer 50 as an example, the personal user registry 56 may comprise a database similar to the central database comprising the registry 116 on the server 110. However, the main difference between the centrally located registry 116 and the personal registry 56 is that the personal registry may be used only by the user of the recipient's local computer 50. In addition, the personal registry 56 can contain a subset of the centralized registry and can be customized by the user where the centralized registry may or may not have this customization accessibility. Although peer to peer networking may allow other computers 48 to access the local personal registry 56, generally, each computer 48 or 50 capable of receiving instant messages uses its own local personal registry 56. The message filter software 60 allows the user to filter instant messages based on both the centrally located user registry 116 and the personal registry 56.

Although not necessarily the case, while the centrally located user registry 116 mainly stores information concerning senders of information with which users of all computers 48 and 50 might be interested in using to filter instant messages, such as corporate employees using the intranet 10, the personal user registries 56 may be used to store information concerning senders of information which individual users may use to filter instant messages. For example, using the BLUEPAGES example above, while the employees in the centralized registry 116 may serve as a universal means for individual users to set criteria for filtering, the internet is quite vast with many users, and it may not be practically possible to list all possible internet senders in the central registry. Rather, the personal registries 56 can be augmented beyond the content available in the central registry 116. Further, the personal registries 56 may store sender information regarding individual internet contacts known by the user, but for which not many other users have an interest in setting filter information. However, the user may wish to no longer receive instant messages from various senders listed in their own personal registry 56. It is less burdensome on the central registry 116 for individual users to set their own criteria for these individual senders.

Figure 3:
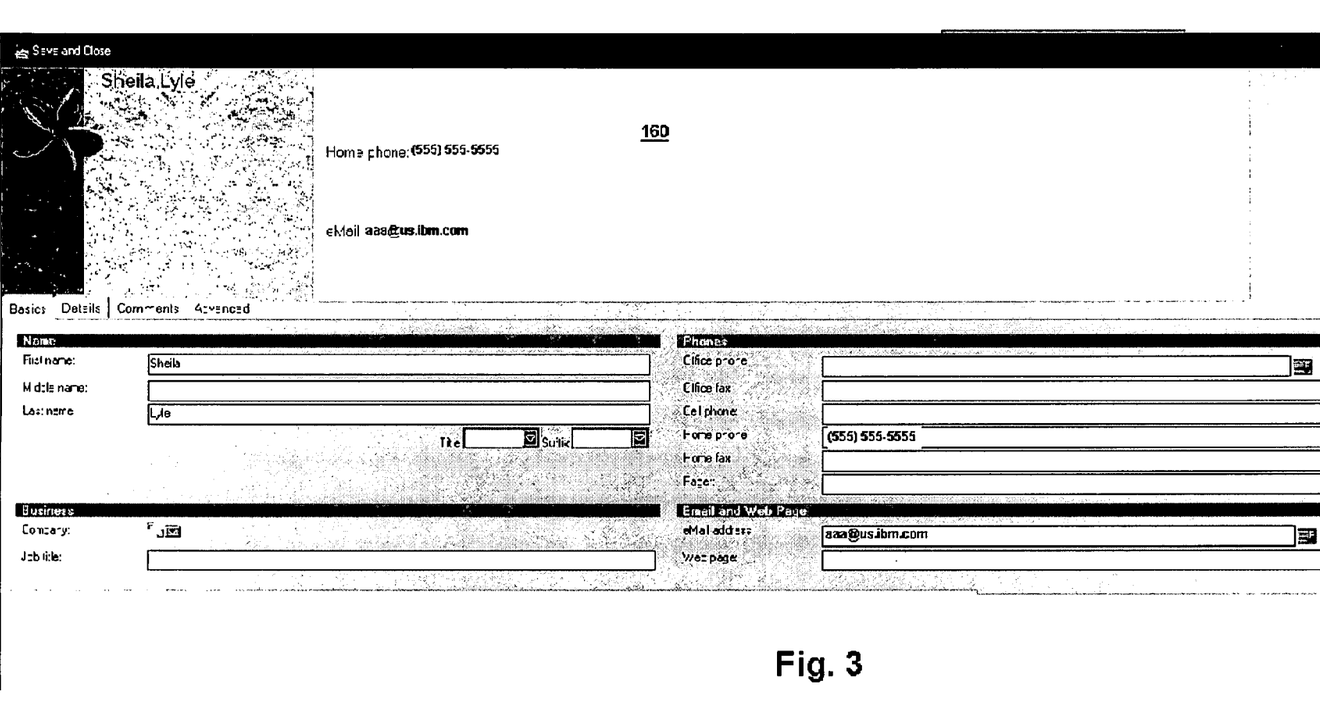
FIG. 3 is a block diagram illustrating an example of a typical Lotus Notes type personal registry address database entry screen according to the embodiment of FIG. 1.

In this regard, the senders who are not part of the intranet 10, but are connected through the internet 20, may be filtered by either their email address extension or host mail server address (e.g., .gov, .com, .edu, junkmailserver.com) or by entry in the personal user registry 56. With reference to FIG. 3, an example of a typical Lotus Notes type personal registry 56 address database entry screen 160 is shown. Some examples of fields in the personal registry 56 that may be available for entry on screen 160 are E-mail Address, Office Phone, Company and Job Title.

Imposing criteria based on one or several of these fields allows the recipient to further determine which instant messages should be delivered using the local personal registry 56. For example, using the personalized Lotus Notes user registry as an example of the personal registry 56, the following further examples illustrate a few of an almost infinite set of possible further rules or business logic which is further determined by the criteria set by a user for filtering instant messages:

1. Deliver message only from those persons with the same last name as the recipient;
2. Deliver messages from only those persons who work for a specific company (as determined by the domain name of the sender's mail server, or the sender's IP address); or
3. Deliver messages from only those persons who are in a specific company located in New York (determined using the area code in the phone number field).

In some embodiments, users have no direct access to the centralized registry 116, except that the registry software 60 may be able to download data from the centralized registry 116, or subsets thereof, to the users' personal registries 56, wherein each user filters messages using the data stored in their personal registry 56.

Figure 4:
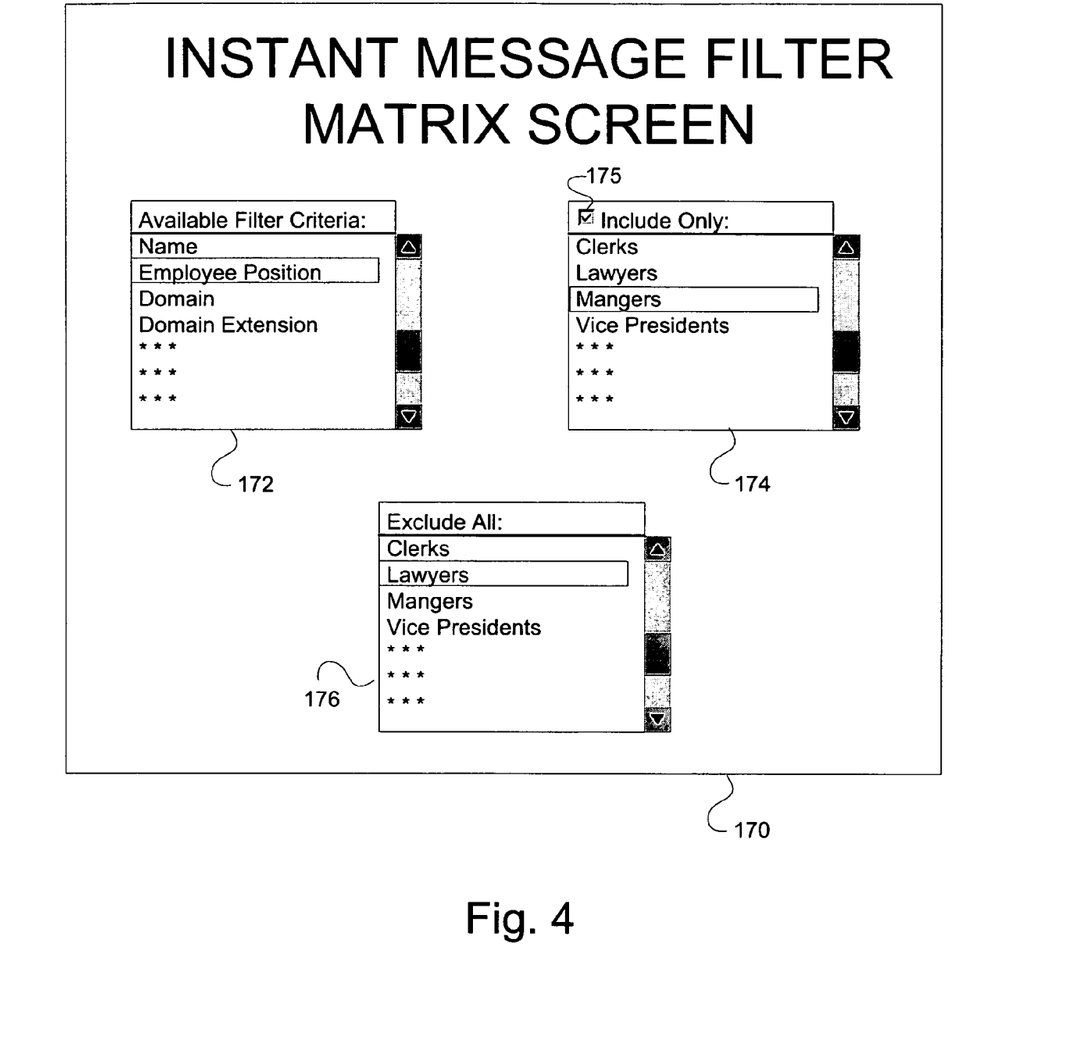
FIG. 4 is a block diagram illustrating a sample message filter screen which may be presented by the message filter software of the embodiment of FIG. 1.

With reference to FIG. 4, a sample message filter screen 170 which may be presented by the message filter software 60 for allowing a user to set instant message criteria is shown. The screen 170 contains a list box 172 which lists all of the available criteria that can be used to filter instant messages. The entries in the list box 172 represent fields of both the centralized user registry 116 and the local user registry 56 which can be used to filter instant messages. The user may select each entry in list box 172 with a cursor.

An "Include Only" list box 174 is presented for allowing selection of values for the current field selected in list box 172. In the case of list box 174, a selection of a value by a user means that messages from a user that meets the criteria for the selected value will be displayed to the user. For example, when the curser is over the Employee Position field in list box 172, the user may select to only receive messages from Mangers and Vice Presidents by selecting those values in list box 174. Because this selection is so limiting, there is a check box 175 to confirm limiting the delivery of messages to the selected values in list box 174 for the selected field in list box 172.

An "Exclude All" list box 176 is used to select the values for the field selected in list box 172 for which a user wants to block receiving of all messages that satisfy the values selected in list box 176. For example, if the Employee Position is selected in list box 172, the user may choose to select the Lawyers value in box 176, to prevent receipt of messages from all users who have the position of Lawyer.

The user may continue to select each of the filter criteria which the user would like to set in list box 172. Each time the user selects a filter criteria in list box 172, such as Domain Extension, the appropriate values for that selection appear in list boxes 174 and 176 for inclusion or exclusion of messages. The selection criteria are stored by the filter software 60 in a local filter table 62 to be accessed by the filter software 60 when messages are received.

Figure 5:
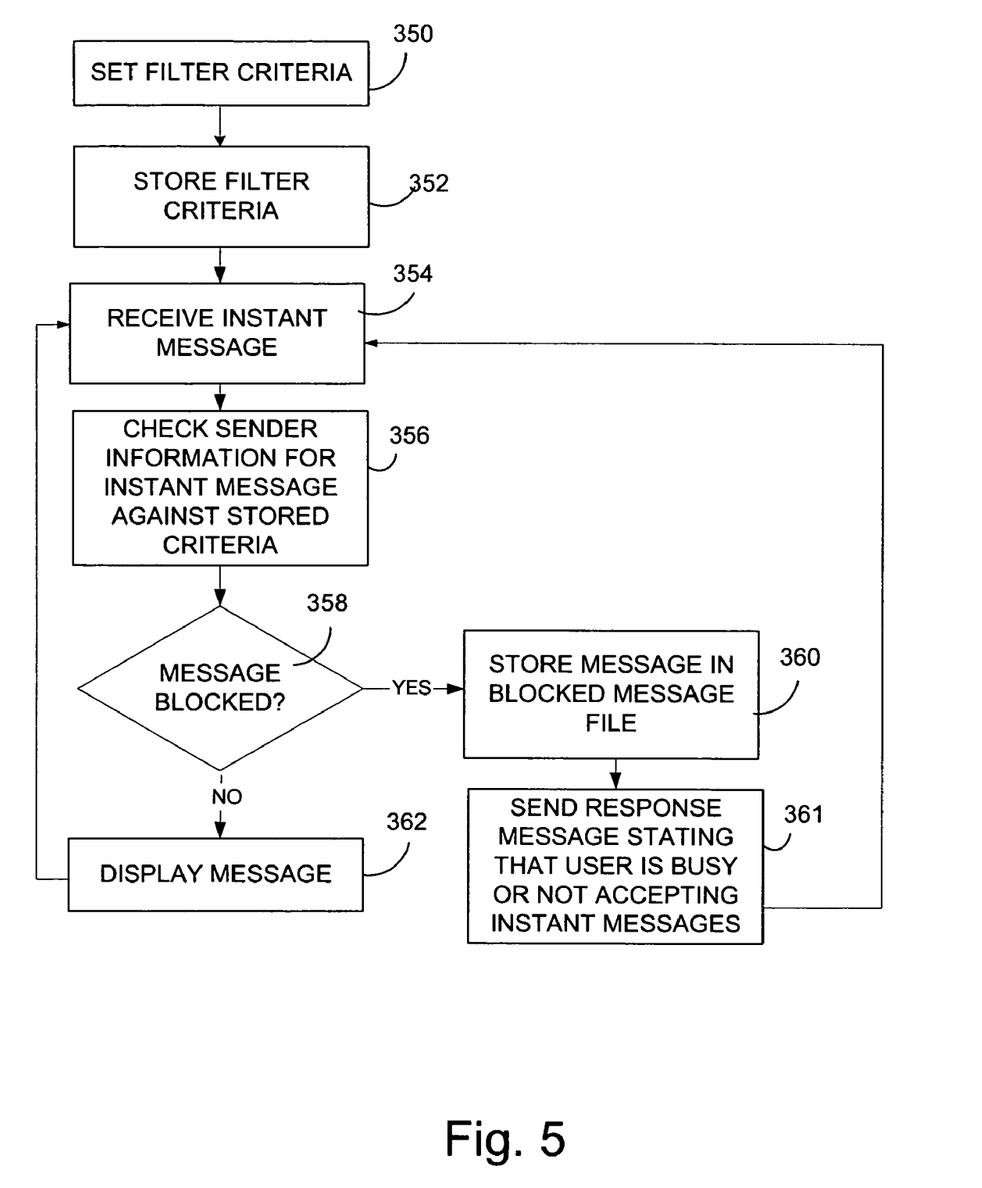
FIG. 5 is a flow diagram indicating a method performed by the filter software of the embodiment of FIG. 1.

With reference to FIG. 5 a flow diagram indicating a method performed by the filter software 60 is shown. The user of the recipient's computer 50 executes the filter software 60 to set the filter criteria for instant messages, step 350. The selected criteria are stored in the filter table 62, step 352.

Figure 6:
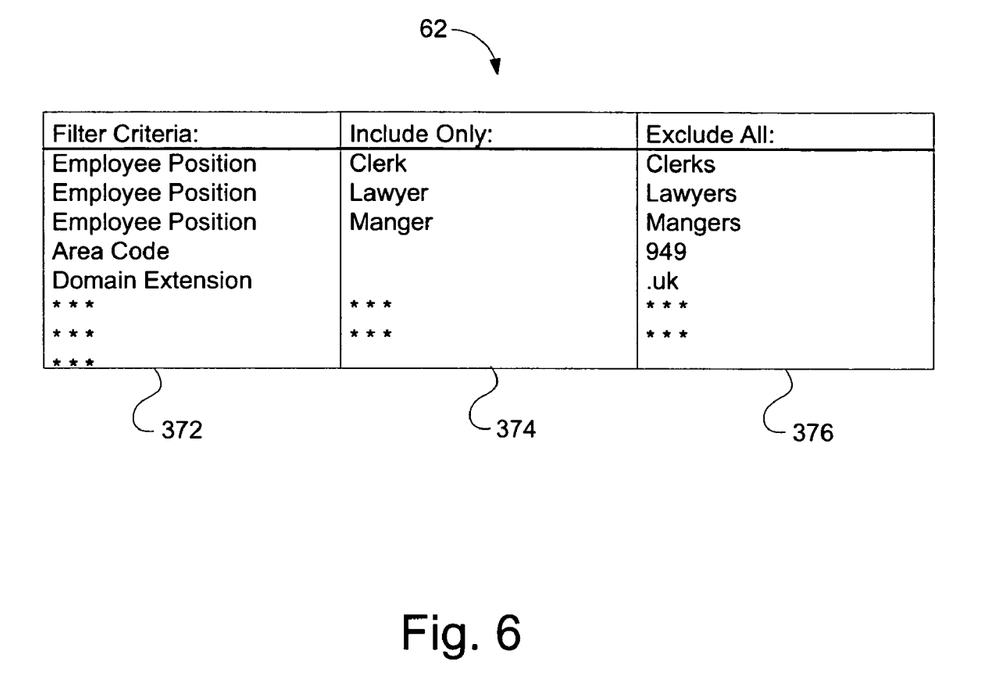
FIG. 6 is a block diagram illustrating detail of a sample filter table of FIG. 1.

With reference to FIG. 6, an example of the stored criteria from the filter table 62 is shown. Although the filter table 62 is preferably normalized into several related and indexed tables for quick processing of lookups and queries performed by the filter software, the data in FIG. 6 has been de-normalized for simplicity of illustration. As shown, the selected fields for setting the criteria for filtering instant messages are stored in column 372. The "include only" values for each field listed in column 372 are stored in column 374. The "exclude all" values for the same are stored in column 376.

After storage of the criteria in the filter table 62, when an instant message is received, step 354, sender information for the message is checked, or compared, against the set filter criteria, step 356. For each message, the sender information is received in tagged format within the message, which is typically in HTML, XML or text format. However, the only information necessary for the filter comparison is identifying information for the sender, such as an e-mail address, user name, or static IP address. The registries 116 and 56 and filter table 62 can each be indexed by this identifying information so that a quick lookup may be performed to find the matching record for each sender of a message. The values for the fields may then be compared against the filter criteria in table 62.

Based on the comparison, if the message is determined to be one that should be blocked, or not displayed to the user, step 358, then the message may be stored in a blocked file 64 instead, which is either stored in the storage device 52 on the recipient computer 50 or in the storage device 110 of the server computer 100, for later review, step 360. Optionally, the registry software 60 sends a response message to the sender of the message stating that user is busy or not accepting instant messages, step 361.

If the message is not determined to be one that should be blocked, the message is displayed to the user, step 362.

In the business logic examples of filter criteria described above, the system can perform the comparing step to determine whether a message should be blocked by merely performing a separate query of the filter table 62 for each received message. For more complex business logic, for example criteria involving if-then-logic (e.g. if "Is Manger" field is "yes", then if not in same company as recipient, etc.), the computer program 62 may contain logic to create scripts which run various queries and case logic against the filter table 62. Those skilled in the art would recognize that many 5$^{th}$ generation database query languages provide for automated script generation to create, for example, SQL scripts for this more complex logic. The result of the more complex implementation of the business logic is a boolean value that is used by the filter software to determine whether the received message should be blocked.

Further, the level of detail concerning filtering of messages may be dependent on the available fields in the registries 116 and 56. Information in the registries 116 and 56 can be used directly, or can be used as metadata to impose constraints (for example using the phone number to determine a sender's location). The strongest advantage of this approach is that permissions can be dynamically assigned and changed as the entries in the database change, without the maintenance of a static listing.

Finally, while the invention has been described in connection with the filtering of messages and instant messages, in other embodiments the same system and methods described above can be used to filter other data, such as chat room lines to be displayed to a user in a chat room. The same method described above may used by chat software to make instantaneous determinations with each chat room line sent to a user's terminal as to whether the line should be blocked. For example, even though two users are in a chat room having many participants, one or both of the two users may decide to set their "Include Only" criteria so that the user can focus on only the other user's messages in the chat room, without having to ask the user to join a separate private room. This allows one user to monitor other conversations in the chat room, while the other user may choose not to monitor only the conversation with the one user.

In another example that may be more germane to other aspects of the present invention, a chat room user may set their filter criteria to view only messages from users who have stated in their chat profile that they have college degrees, or have attained a certain position in their company.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing user registry management of messages comprising:

viewing an indexed directory listing of senders of messages;

setting filter criteria for filtering messages based on the viewing, the filter criteria being selected from both a remote database and a local database, both databases including characteristics for the senders of messages, wherein the messages are instant message, the setting of the filter criteria includes selecting at least one of the filter criteria, the selecting includes an option to include at least one filter criteria sub-element and to exclude at least one other filter criteria sub-element, the filter criteria sub-elements being sub-elements of the selected filter criteria, the remote database cannot be directly accessed, allowing only data to be downloaded from the remote database to the local database, the local database contains a subset of the remote database which can be further supplemented upon by at least one user accessing the local database;

receiving one or more messages from one of the senders;

determining the characteristics of the sender of the received one or more messages at a processor of a computing device of the sender;

blocking display of the at least one of the received one or more messages if the filter criteria are met by the characteristics of the sender from at least one of the remote database and the local database; and sending a response message to the sender in response to the one or more messages, the response message indicating a recipient is either busy or not accepting instant messages.

2. The method of claim 1, wherein the step of determining the characteristics comprises, for each received message, matching an identity of the sender in a registry containing the characteristics of the sender and reading the characteristics for the matched identity.

3. The method of claim 1, wherein the step of determining the characteristics comprises, for each received message, reading the characteristics from tagged information received with the received message.

4. A system for providing user registry management of messages comprising:

a plurality of memory devices storing filter criteria for filtering messages, the filter criteria being stored both in a local database and a remote database including characteristics for the senders of messages, wherein the messages are instant messages, the remote database cannot be directly accessed, allowing only data to be downloaded from the remote database to the local database, the local database contains a subset of the remote database which can be further supplemented upon by at least one user accessing the local database;

a viewing system for viewing an indexed directory listing of senders of messages;

a selection system for setting the filter criteria, the setting of the filter criteria includes selecting at least one of the filter criteria based on the viewing, the selecting includes an option to include at least one filter criteria sub-element and to exclude at least one other filter criteria sub-element, the filter criteria sub-elements being sub-elements of the selected filter criteria;

a receiving system for receiving one or more messages from one of the senders; and a plurality of programmed processors for determining the characteristics of the sender of the received one or more messages, for blocking display of at least one of the received one or more messages if the filter criteria are met by the characteristics of the sender from at least one of the local database and the remote database and sending a response message to the sender in response to the one or more messages, the response message indicating a recipient is either busy or not accepting instant messages.

5. The system of claim 4, wherein the programmed processor is configured to determine the characteristics of the sender of each received message by matching an identity of the sender in a registry containing the characteristics of the sender and reading the characteristics for the matched identity.

6. The system of claim 4, wherein the programmed processor is configured to determine the characteristics of the sender of each received instant message by reading the characteristics from tagged information received with the received instant message.

7. A computer program product having a computer readable storage medium having computer program logic recorded thereon for providing user registry management of instant messages comprising:

computer readable means for viewing an indexed directory listing of senders of messages;

computer readable means for setting a filter criteria, wherein the setting of the filter criteria includes selecting at least one of the filter criteria based on the viewing, the selecting includes an option to include at least one filter criteria sub-element and to exclude at least other filter criteria sub-element, the filter criteria sub-elements being sub-elements of the selected filter criteria;

computer readable means for receiving one or more instant messages from one of the senders;

computer readable means for determining the characteristics of the sender of the received one or more instant messages;

computer readable means for matching an identity of the sender in at least one of a plurality of registries containing the sender and the characteristics of the sender and reading the characteristics for the matched identity, the registries being disposed in both a local database and a remote database;

computer readable means for blocking display of the at least one of the received one or more instant messages if the filter criteria are met by the characteristics of the sender from at least one of the remote database and the local database, wherein the remote database cannot be directly accessed, allowing only data to be downloaded from the remote database to the local database, the local database contains a subset of the remote database which can be further supplemented upon by at least one user accessing the local database; and computer readable means for sending a response message to the sender in response to the one or more messages, the response message indicating a recipient is either busy or not accepting instant messages.

8. The computer program of claim 7, wherein the computer readable means determining the characteristics comprises, for each received instant message, computer readable means for reading the characteristics from tagged information received with the received message.

* * * * *